Sept. 16, 1952     E. R. ORSATTI ET AL     2,610,995

ELECTROMAGNETIC CIRCUIT INTERRUPTER

Filed Dec. 23, 1948     2 SHEETS—SHEET 1

ERNEST R. ORSATTI,
DONALD A. LACE,
INVENTORS

BY

*ATTORNEY*

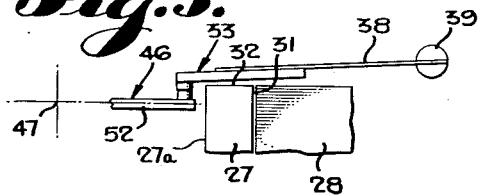
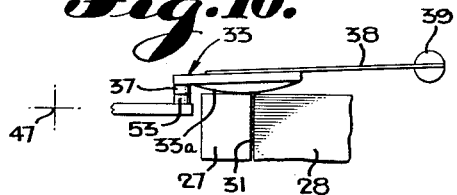
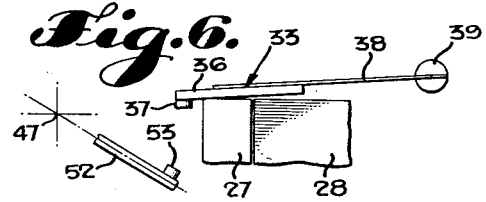
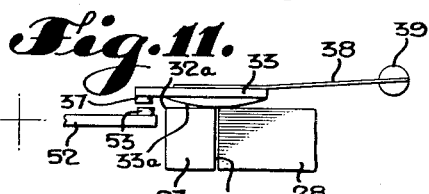
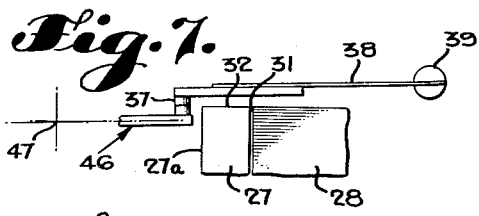
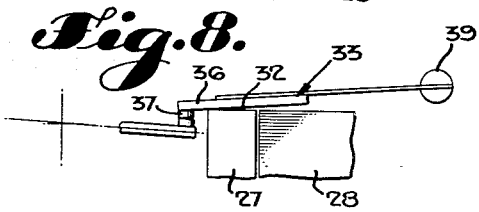
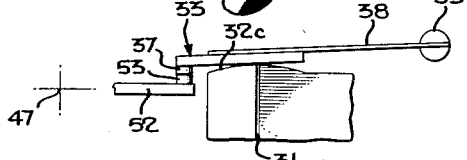
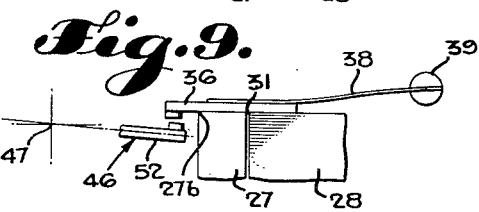
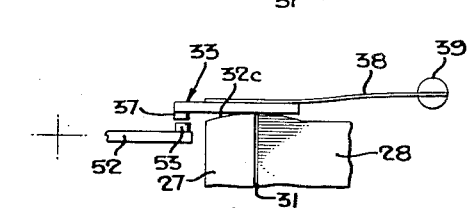
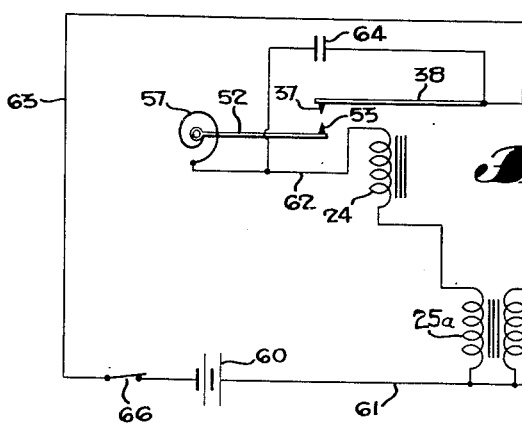

Patented Sept. 16, 1952

2,610,995

UNITED STATES PATENT OFFICE 2,610,995

ELECTROMAGNETIC CIRCUIT INTERRUPTER

Ernest R. Orsatti, North Hollywood, and Donald A. Lace, Los Angeles, Calif.

Application December 23, 1948, Serial No. 66,854

11 Claims. (Cl. 172—126)

1

This invention relates generally to electrical circuit interrupters, particularly of a type such as are used in devices for momentarily and periodically flashing gaseous tube signal lamps from a battery power source, such signal devices being used for such purposes as traffic control, landing field marker lights, mountain-top markers, buoys, lighthouses, and the like, where absolute reliability and long life are of the utmost importance. Such devices are also useful in commercial neon tube lighting characteristics. The present invention deals broadly with electromagnetically operated circuit interrupters, useful in many fields, and in more specific aspects, with signal devices incorporating such circuit interrupters.

Signal devices of the class referred to may be characterized generally as embodying an electromagnet provided with a movable armature carrying an electrical contact which, when the armature is pulled down, exerts a thrust against a mating electrical contact carried by a balance wheel which is in turn equipped with a hair spring acting to urge the wheel in a direction contrary to the direction of received thrust. The two contacts mentioned are in circuit with the battery power source and the electromagnet, so that the magnet is energized when the contacts are together. When the magnet is thus energized, the armature pulls down, and its contact thrusts the balance wheel through a part of a turn, its kinetic energy going to strain the hair spring, which brings the wheel to a stop, and then, returning its stored energy to the balance wheel, thrusts the latter in the reverse direction, i. e., back toward the contact carried by the said armature. As the balance wheel-carried contact separates from the armature-carried contact, the circuit energizing the electromagnet is broken, so that the armature separates from the electromagnet. At the end of the return stroke of the balance wheel, its contact again makes contact with the armature contact, causing the magnet to be again energized, and the cycle is repeated. The electromagnet has commonly included a secondary circuit leading to a neon tube, and of course, the making and breaking of the primary circuit creates transient voltage impulses in the secondary circuit capable of periodically flashing the neon tube.

Equipment of the type described in the preceding paragraph has suffered in the past from two major faults, one of which being a tendency for the armature to stick down against the electromagnet with the two contacts together, thereby

2 short-circuiting the battery and running it down in a very short period of time. The other major difficulty has been a contact time during which the two electrical contacts are together which is of such duration as to impose so high a current drain on the battery that battery life is not up to the requirements of the installation, particularly when the installation is to be made at relatively inaccessible locations.

A major object of the invention is therefore the provision of a circuit interrupter of the class mentioned which incorporates means for preventing the armature from sticking down against the electromagnet with the contacts in closed position, and which therefore is guarded against locking in an inoperative position, with the battery short-circuited.

A further major object of the invention is the provision of a signal or neon tube flashing device of the character described which incorporates a feature reducing markedly the contact time of the two contacts, thereby reducing greatly the current drain on the battery, and increasing the life of the latter correspondingly.

These and further objects of the invention, together with various additional objects not preliminarily mentioned, will best be understood from the following detailed description of a present illustrative embodiment thereof, reference for this purpose being had to the accompanying drawings, in which:

Figure 4 shows a modification of the wiring circuit of Figure 3;

Figures 5 through 9 are successive diagrammatic views illustrative of the action of the armature at various stages of operation;

Figures 10 and 11 are diagrammatic views illustrative of a modification, and showing two successive positions; and Figures 12 and 13 are similar diagrams showing successive stages of operation of still another modification of the invention.

Figure 1:
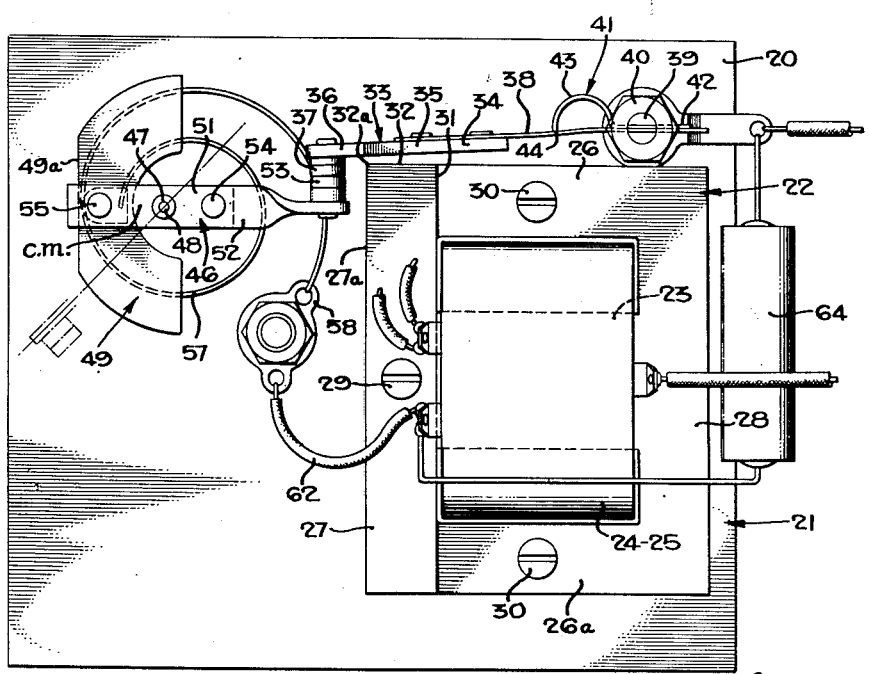
Figure 1 is a side elevational view of a circuit interrupter in accordance with the invention, the drawings being to one and one-half scale of a present actual embodiment.
Figure 2:
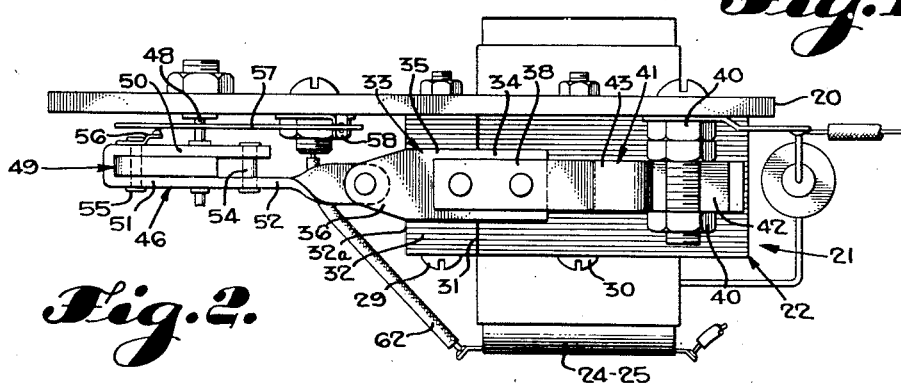
Figure 2 is a top plan view of the device shown in Figure 1.

In Figures 1 and 2, numeral 20 designates generally a vertically disposed base panel, of insulation material, on which the apparatus is mounted. The electromagnet is designated generally by numeral 21, and is in this instance in the form of a step-up transformer having magnetic shell-type core 22, including center leg 23 for the primary and secondary windings 24 and 25 (see also Figure 3), and outside legs 26 and 26a, this shell-type core being made up of abutting I- and E-shaped laminations 27 and 28, disposed in abutting relationship, and secured to panel 20 by means of screws 29 and 30. The laminations will be understood to be enameled or lacquered according to conventional practice, whereby the iron magnetic circuit is interrupted at the junctures between the I- and E-shaped laminations. This is of importance to the present transformer at the juncture between the upper leg 26 and the I-shaped laminations 27, where this juncture results in the provision of a magnetic gap 31, thus causing magnetic lines of force to arch up into space above the flat upper surface 32 of the core. It will be seen that this flat surface 32 extends from gap 31 the full length of the upper edge surfaces of the E-shaped laminations 28, and, in the opposite direction, for the full length of the upper end edges of the I-shaped laminations 27. The outside longitudinal edges of laminations 27 form a flat core surface 27a which intersects surface 32 at right angles to form a right angle corner 32a.

The panel 20 will be understood to be apertured opposite the transformer winding, so as to permit the winding to extend through, as clearly indicated in Fig. 2.

A soft iron armature plate 33 is mounted over the flat core surface 32, and this armature may be regarded as having a rearward portion 34, located rearwardly (to the right) of the magnetic gap 31, and a forward portion 35 located forwardly (to the left) of the magnetic gap 31, the portion 35 including also a tapering nose part 36 projecting a short distance beyond the core corner 32a and carrying on its underside, in an overhanging position, an electrical contact 37. Armature plate 33 is riveted to the underside of a flat spring arm 38, preferably of beryllium copper, mounted over and near the right-hand portion of the core, as viewed in the figures, on a suitable mounting means carried by panel 20, this mounting means being in this instance in the form of a stationary screw 39 projecting from panel 20 and split to receive the rearward end portion of the flat spring arm 38, a nut 40 being used on the screw to tighten or clamp the same against opposite surfaces of the spring arm. To give additional stiffness to the spring arm, and to provide for adjustability of stiffness, an additional spring member 41 is preferably employed, this member including a flat rearward portion 42 positioned flat against the upper surface rearward portion of arm 38 and inserted through the split in screw 39 together with the arm 38. This spring member 41 includes also a forward portion 43 of arch-shaped contour whose forward end 44 abuts against the upper surface of the arm 38 at a point somewhat forwardly of the screw 39. It will be seen that this spring member 41 may be moved forwardly and rearwardly along the spring arm 38 for adjustment purposes, the amount of stiffness which it contributes depending upon the distance of its end portion 44 from the mounting screw 39.

As shown, the mounting screw 39 for the rearward end portion of the spring arm 38 is spaced somewhat above the flat core surface 32, and the spring arm 38 is normally disposed at a downward inclination from the screw 39, so that this spring arm 38, and the flat armature plate 33 carried thereby, normally make an acute angle with the flat upper core surface 32. This normal position, however, is one in which the underside of the flat armature is still appreciably spaced from core surface 32, for instance as illustrated in Fig. 1. Thus, as described, the arm 38 and armature 33, when the apparatus is at rest, normally make a small acute angle with core surface 32, and it will be seen that when the armature is pulled down by the electromagnet, as to the position represented in Figure 6, the arm 38 and armature 33 will make an acute angle of a little greater magnitude with the flat core surface 32. The fact that this acute angle appears under the last-named condition, that is, with the armature pulled down into striking position with the core, is of more importance than is the fact that the arm 38 and core 33 make a slight acute angle with surface 32 in the inactive or normal position of Figure 1, as will become evident as the description proceeds.

The balance wheel employed in the present device is preferably in the form of a beam 46 pivoted at 47 on horizontal spindle 48 mounted on and projecting from panel 20, together with a counter-weight 49 employed to secure balance about the axis of the shaft 48. In the specific embodiment here shown, the beam includes an electrically conductive strap, composed for instance of brass, bent to form a short inside leg 50 and a longer outside leg 51, the latter providing a radial arm 52 which is twisted at its free end and bears an electrical contact 53 adapted to strike upwardly against the aforementioned contact 37 carried by the free end of spring arm 38. On the opposite side of this contact-carrying arm 52, the two legs of the strap lie adjacent opposite sides of counter-weight 49, which in the present instance is of generally arcuate shape, having been conveniently fabricated by cutting an iron washer in two, and flattening the arcuate edge, as indicated at 49a. The two legs 50 and 51 are connected together by means of rivets 54 and 55, the latter passing through counter-weight 49, and also carrying a lug 56 to which is soldered the inner end of hair spring 57. The outer end of this hair spring is soldered to a stationary lug 58 secured to panel 20. This hair spring acts to rotate the arm 52 in a counterclockwise direction, and is under some stress in the limiting position of Figure 1. Rotation of arm 52 in a clockwise direction thus tends to open the hair spring wider, setting up additional stress tending to return the arm in a counterclockwise direction.

Figure 3:
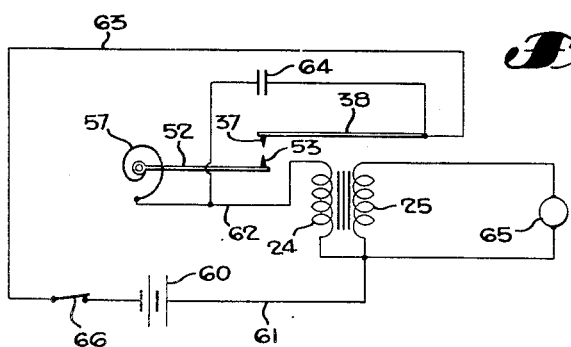
Figure 3 is a schematic wiring circuit of the interrupter.

A typical circuit for the interrupter is shown in Figure 3, where the transformer windings, primary and secondary, the spring arm 38, the electrical contacts 37 and 53, the pivoted arm 52, and the hair spring 57 again appear. The battery power source is indicated at 60 and one terminal thereof is shown connected by conductor 61 to one end of both the primary and secondary transformer windings, which are connected together. The other end of the primary winding 24 is connected by a conductor 62 to hair spring 57, the circuit being continued from the hair spring through arm 52 to contact 53. The other side of battery 60 is connected by circuit lead 63 to spring arm 38, which continues the circuit through the armature plate to contact 37, and a condenser 64 is connected across electrical contacts 37 and 53 for the usual purpose. The transformer secondary winding connects typically to neon flash tube 65.

The operation of the device is as follows: assume first that the parts are in their normal at rest position indicated in Figures 1 and 5, and that a switch 66 in the battery circuit is operated to close the circuit. Contacts 37 and 53 being closed, the electromagnet formed by the transformer is energized, and armature 33 is attracted and drawn downwardly by reason of the magnetic field created over and between the magnetic gap 31, the spring arm 38 bending accordingly. The armature thus moves sharply down, its forward end portion, or "toe," striking the core surface 32 at corner 32a. This movement of the armature exerts a clockwise thrust or moment against the oscillatory arm 52, and the latter continues to travel clockwise as the armature is arrested in its downward movement by the engagement with the core, as already described. The circuit being broken by the separating contacts, the transformer is de-energized, and the armature 33 is released and moves upwardly under the influence of the spring arm 38. Arm 52 continues to travel until its kinetic energy is converted into potential energy in the stressed hair spring, whereupon it stops and is thereupon accelerated in the reverse direction by the stressed spring, which now delivers its stored potential energy to the arm and moves the latter back toward the contact 37 carried by the spring arm 38. Striking the contact 37, the arm 52 deflects the spring arm 38 to such a position as shown in Fig. 7, which position may approximate a position parallel with that of the upper surface of the transformer core, though not necessarily so. The contacts 37 and 53 being then again closed, the transformer core is again magnetized, and the armature pulled downwardly toward the position of Figure 6 to repeat the cycle. Each time the circuit is made and broken, a transient high voltage pulse is delivered by the secondary winding of the transformer to flash the neon tube 65.

It sometimes may occur in devices of this type that the armature will be pulled down against the core, but the arm 52 will not be driven ahead to separate the electrical contacts, causing the parts to come to rest in the position represented in Figure 8. Without the provision of some means for breaking the circuit under such conditions, the battery is simply short-circuited and will rapidly exhaust itself. One of the primary features of the present invention is the provision of means for automatically separating the two contacts 37 and 53 from one another under such conditions, and this action is illustrated in Figure 9. Assume first that the armature is down, with its toe portion against the core, but that the contacts 37 and 53 have remained together. The energizing circuit for the transformer remaining closed, the rearward or heel portion of the armature will under these conditions be pulled downwardly into full engagement with the core surface 32, this being permitted by a reflex bending of the spring arm 38, as represented in Figure 9. It will be seen that the armature plate 33 is first moved down to the inclined or angular position of Figure 8, and is then rocked by a kind of pivotal action on the fulcrum formed by the corner 32a of the core between the surfaces 32 and 27a, until its rearward or heel portion is flat down against the core. In the course of this pivotal or rocking action, the forwardly projecting end portion 36 of the armature moves rapidly in an upward direction through an appreciable angle, sufficient to separate the contact 37 from the contact 53 and so break the circuit. The spring 57 and the counter-weighted arm 52 have such spring and inertia constants that the arm 52 is unable to follow the armature plate in this rapidly occurring pivotal action, with the result that the described separation of the contacts 37 and 53 takes place, and this circuit is therefore broken and the transformer de-energized. This of course results in the parts moving back to the position of Figure 5, where the cycle will be automatically re-started. It is found in practice that this capability for rocking action of the armature 33 positively prevents the contacts from remaining in closed position with the armature down against the core, and there is accordingly complete protection against the device failing in service from this cause. We have, in fact, found it impossible to force the present device to remain in the position of Figure 8, the action described always occurring to place the device instantly into proper operation.

It should be evident that in the normal operation of the device, the time during which the contacts 37 and 53 will remain closed will be determined partly by the stiffness of the spring arm 38 (which is adjustable by means of adjustment spring 41 as already described), partly by the moment of inertia of the rotatably mounted balance wheel constituted by the pivoted and counter-weighted contact-carrying arm 52, and partly by the moment arm of the thrust exerted against the arm 52. To secure a long moment arm, we employ a relatively long contact-carrying arm 52, and to secure a low moment of inertia we employ a counter-weight 49 whose center of mass is located relatively close to the pivot axis of the arm, that is, substantially closer to the pivot axis than is the center of mass of the contact-carrying arm. Since the angular acceleration which will be imparted to the arm and its counter-weight will be proportional to the product of the thrust received from arm 38 multiplied by the radius of arm 52, and inversely proportional to the moment of inertia of the arm and its counter-weight, the provision of a long arm and a low moment of inertia increases the angular acceleration of the arm 53 for a given thrust received from the arm 38, and hence reduces the time during which contacts 37 and 53 will remain together. As stated, the center of mass of the counter-weight is spaced relatively closely to the pivot axis, or substantially closer to the pivot axis than is the center of mass of the arm 52, this being accomplished by a proper mass distribution of the counter-weight about the pivot axis. It is of course necessary that the oscillating assembly have sufficient moment of inertia to assure proper co-action with a hair spring of reasonable proportions, as well as to avoid so fast an action that the transformer is not given time to saturate; but in general, the lower the moment of inertia, the more rapid will be the response to thrust received from the armature arm 38, and the lesser will be duration of the electrical contact, and therefore the current drain from the battery. The proportions shown in Figures 1 and 2 give the necessary lever arm, the necessary dynamic balance, and the required low moment of inertia of the counter-weight, to assure satisfactory operation in practice. With the proportions there illustrated, which are typical, the center of mass C.-M. of the counterweight is spaced about one-quarter the spacing of the center of mass of the arm 52 from the pivot axis. It will be seen that the matter may also be viewed as the provision of a counterweight for the arm 52 having a mass distribution relative to the pivot axis such that its radius of gyration is substantially less than (e. g., approximately one-quarter) the radius of gyration of the contact-carrying arm 52. With these proportions, the present device has a contact time of the order of a millisecond at a frequency of 240 oscillations (flashes of the neon tube) per minute. On test with a standard silver cell, the current flow in the circuit deposits 2.91 milligrams of silver per hour, which corresponds with an average flow of .723 milliampere. Battery life under such conditions reaches many weeks of continuous service. It is interesting to note that, at a flash frequency of around 240 per minute, a conventional neon tube will appear at a distance, owing to persistence of vision, to give a continuous illumination. This effect is enhanced with special tubes having hang-over or after glow characteristics.

The device as described is rugged, infallible in service, extends battery life to an unprecedented degree, and, moreover, is operative in any position.

Figures 10 and 11 show a modification, in which the armature plate has a convex lower surface 33a, designed to make initial contact with the core somewhat forwardly or to the left of the gap 31 in the normal operation of the apparatus. Should the contacts stay together, however, as indicated in Figure 10, then the armature plate will pivot or rock backwardly on the convex surface 33a, as to the position of Figure 11, causing its forward extremity to move upwardly and separate the contact 37 from the contact 53, as illustrated in Figure 11. It will be seen that the operation is essentially the same as that previously described, the only exception being that the armature plate rocks on its convex rocker surface 33a rather than on the corner 32a of the core.

Figures 12 and 13 show a further modification, in which the core has at the top a convex curve 32c, half on each side of the gap, against which the armature plate 33 is pulled down, and on which said plate may rock. Figure 12 shows a position with the armature plate pulled down to its normal extent, but with the contacts together. Under such conditions, the rearward or heel portion of the armature plate is pulled down, the plate rocking on curved core surface so as to lift its contact carrying end, and so separate the contacts.

According to the modified electric circuit of Figure 4, the armature understood to be carried by the spring arm 33 is operated by an electromagnet having winding 24, which will be understood to have the same essential core characteristics as described above, but the electromagnet may not in this instance be a transformer, having no secondary winding. In this case, a separate transformer 82 is employed, its primary winding 25a being included in series in the circuit, and its secondary winding 25 being connected to flash tube 65, as indicated. It will be evident that voltage pulses capable of flashing the neon tube will appear in the secondary winding of this transformer as the circuit is made and broken.

It will be understood that the drawings and description are for illustrative purposes only, and that various changes in design, structure and arrangement may be made without departing from the subject and scope of the invention as defined by the appended claims.

We claim:

1. In a device of the character described, an electromagnet including a core, an armature adapted to be attracted to said core when said electromagnet is energized, flexible resilient means carrying said armature for movement to and from said core, and for rocking action relative to said core, said means yieldingly urging said armature to move to a normal position spaced a predetermined distance from said core, an electric contact movable with said armature, a coacting movable electrical contact engaged by said first mentioned contact in said predetermined position and arranged to be moved by said first mentioned contact when said armature is attracted by and moves toward said core, and coacting inter-engaging armature-rocking means on and between said armature and core operable under sustained magnetic attraction of the electromagnet for the armature following initial engagement of the armature with said core to rock said armature relative to said core in a direction to move the armature carried contact back from the second mentioned contact.

2. A device as defined in claim 1, wherein the core has a surface engageable by the armature, and wherein the flexible, resilient means mounting the armature guides the armature in movement toward said core surface so as first to strike said core surface at an acute angle thereto, and thereafter to yield to permit the armature to rock toward said core surface in a pivotal action tending to move said contacts apart.

3. A device as defined in claim 1, wherein the core has a surface interrupted by a gap and terminating in a corner forming a fulcrum which is engageable by the armature, and wherein the flexible, resilient means mounting the armature guides the armature in movement toward said core surface so as first to engage said surface at an acute angle and upon said corner, and thereafter to yield to permit the armature to rock toward said surface on said core corner in a pivotal action tending to move said contacts apart.

4. A device as defined in claim 1, wherein the core has a surface engageable by the armature and wherein the armature has a rocker bottom engageable with said surface, said flexible, resilient means mounting the armature in such manner as to cause one end portion of said rocker bottom first to strike said core surface, and thereafter to yield to permit the armature to rock down on said core surface in a pivotal action tending to move said contacts apart.

5. A device as defined in claim 1, wherein the core has a convex surface portion engageable by the armature, and wherein the flexible resilient means mounting the armature guides the armature to strike said convex core surface, and then yields to permit the armature to rock on said surface with a pivotal action tending to move said contacts apart.

6. In a device of the character described, an electromagnet including a core, an armature plate adapted to be attracted to said core when said electromagnet is energized, a movable electric contact carried with said armature, and a spring cantilever arm stationarily mounted at one end and carrying said armature at its free end, said spring cantilever arm being so mounted and disposed relative to said core as to bend toward the core to support said armature plate at an acute angle relative to the core when the armature plate is attracted by the core and so that a forward toe portion of the armature engages the core, said arm thereafter bending reflexly to permit said armature to pivot on its said toe portion while its rearward heel portion moves downward toward the core during sustained magnetic attraction of the core for the armature plate.

7. In a device of the character described, an electromagnet including a core having a leg interrupted by a gap, said leg having an external surface extending on both sides of said gap and terminating in a corner adapted to function as a fulcrum, an armature plate adapted to be attracted by the magnetic field above said core surface across said gap when said electromagnet is energized, an electrical contact movable with said armature plate, a spring cantilever arm stationarily mounted at one end and carrying said armature at its free end, said arm normally positioning said armature plate at a predetermined separation distance from said core surface over said gap, with a toe portion of the armature plate overhanging said core corner, and being so disposed and arranged that, upon energization of said electromagnet, it bends towards said core surface in a manner causing said armature plate to initially strike said corner at an acute angle to said surface, said armature plate thereafter rocking on said core corner to engage fully against said surface on both sides of said gap, and said spring arm bending reflexly to accommodate said rocking action, another movable electrical contact adapted to be engaged by the armature carried contact in the normal position of said spring arm, the last mentioned contact being movable by the armature carried contact when the armature is attracted by said electromagnet, and said armature carried contact being moved back from the second mentioned contact upon undergoing said rocking action, and an electric energizing circuit for said electromagnet including said electrical contacts.

8. In a device of the character described, an oscillating contact-carrying arm spring urged to move in one direction of travel, a flexible spring cantilever arm carrying at its free end a contact positioned in the path of travel of the contact carried by said oscillating arm in its said one direction of travel, an armature plate carried by said moving arm near the free end of the latter, and an electromagnet adapted to be energized through said contacts to attract said armature and move it against said oscillating arm when the contact carried by the latter engages the contact carried by the spring arm, said electromagnet including a core member having a surface opposed to said armature and struck thereby when attracted by said electromagnet, said spring arm being disposed relative to said core surface to normally support said armature at an acute angle relative to said core surfce as said armature strikes said surface, and thereafter to bend to permit said armature to be pulled further down against said surface in the event the electromagnet is not deenergized instantly upon first striking of the armature against said surface.

9. In a device of the character described, an electromagnet including a core having a leg interrupted by a gap, said leg having an external surface extending on both sides of said gap and terminating in a corner adapted to function as a fulcrum, an armature plate adapted to be attracted by the magnetic field above said core surface across said gap when said electromagnet is energized, an electrical contact movable with said armature plate, a spring cantilever arm stationarily mounted at one end and carrying said armature at its free end, said arm normally positioning said armature plate at a predetermined separation distance from said core surface over said gap, with a toe portion of the armature plate overhanging said core corner, and being so disposed and arranged that, upon energization of said electromagnet, it bends towards said core surface in a manner causing said armature plate to initially strike said corner at an acute angle to said surface, said armature plate thereafter rocking on said core corner to engage fully against said surface on both sides of said gap, and said spring arm bending reflexly to accommodate said rocking action, a pivoted, oscillating arm spring-urged to move in a given direction, an electric contact carried by said arm, said pivoted arm being movable in said given direction along an arc carrying its contact into engagement with said contact carried by said cantilever arm, and an electric energizing circuit for said electromagnet including said electrical contacts, said pivoted contact-carrying arm being moved in a direction contrary to said given direction by the contact carried by said cantilever arm when said electromagnet is energized and said armature attracted thereto, and said armature plate rocking on said core corner as aforesaid to separate the contact carried by the cantilever arm from the contact carried by said pivoted arm in the event said contacts remain together when said armature plate initially strikes said core corner.

10. A combination as defined in claim 9, wherein said pivoted arm has a counterweight whose center of mass is located substantially nearer to the pivot axis of the arm than is the center of mass of said arm.

11. In a device of the character described, an electromagnet including a core, an armature plate adapted to be attracted to said core when said electromagnet is energized, a movable electric contact carried with said armature, a spring cantilever arm stationarily mounted at one end and carrying said armature at its free end, said spring cantilever arm being so mounted and disposed relative to said core as to bend toward the core to support said armature plate at an acute angle relative to the core when the armature plate is attracted by the core and so that a forward toe portion of the armature engages the core, said arm thereafter bending reflexly to permit said armature to pivot on its said toe portion while its rearward heel portion moves downward toward the core during sustained magnetic attraction of the core for the armature plate, and an adjustment spring engageable with said spring cantilever arm at varying distances from its stationary mounting.

ERNEST R. ORSATTI.
DONALD A. LACE.

REFERENCES CITED

The following references are of record in the file of this patent:

UNITED STATES PATENTS

| Number | Name | Date |
| --- | --- | --- |
| 2,129,882 | Shattuck et al. | Sept. 13, 1938 |
| 2,185,683 | Barrett et al. | Jan. 2, 1940 |